3,437,613
ACID EMULSIONS OF PETROLEUM RESIN-
BASED BINDING AGENTS
Charles Gaestel and Marcel Leveuf, Mont-Saint-Aignan, France, assignors to Esso Standard Societe Anonyme Francaise, Paris, France, a corporation of France
No Drawing. Filed Apr. 6, 1964, Ser. No. 357,788
Claims priority, application France, Apr. 9, 1963, 930,983
Int. Cl. C08f 47/18
U.S. Cl. 260—17
8 Claims

ABSTRACT OF THE DISCLOSURE

Stable aqueous acidic emulsions of the petroleum resin-in-water type are prepared by emulsifying an admixture of from about 45 to about 75 wt. percent of petroleum resin, water, acid, a cationic emulsifier, and an acid-stable, water-soluble colloid forming compound selected from the group consisting of polyvinyl alcohol, an alkyl cellulose, an alkyl hydroxy alkyl cellulose, polyglycol, polyglycol fatty acid ester, and water-soluble starch. The petroleum resin may be fluxed with a mineral oil prior to its admixture with the other components of the emulsion. The emulsions, with or without added pigments, are useful as coating compositions for bonding mineral aggregates used as road surfaces.

---

This invention relates to the stabilization of acid emulsions of resins derived from diolefin-containing petroleum fractions.

The so-called steam-cracked petroleum resins are derived from steam-cracked naphthas, e.g. naphthas boiling within the range 30 to 280° C. After the petroleum gases have been removed, the residual condensed liquid is rich in olefins and diolefins, and may be polymerized with the aid of a Friedel-Crafts catalyst. Such resins may also be derived from other mixtures of olefins and diolefins, the diolefins being present in sufficient proportion to obtain a solid resin, as distinct from an oil or rubbery substance. Such resins usually have a softening point as measured by the "Ball and Ring method" (ASTM method D36–26) of from 50 to 180° C.

Such resins being hard amorphous substances, they are usually fluxed with hydrocarbon oils to increase their plasticity. Such fluxing oils include petroleum distillates and solvent extracts, the proportion of fluxing oil being for example between 5% to 60% by weight, based on the total composition, preferably from 20% to 40%. The fluxing oil may be incorporated into the resin after polymerization has taken place, or the polymerization reaction may be carried out in the presence of the oil, the polymerization reaction being thereafter distilled to obtain the final product having the required hardness.

Acid emulsions of petroleum resins are used inter alia for coating acid mineral aggregates for road-surfaces and the like. Such emulsions have previously been prepared by dispersing the resins in water containing an acid, e.g. a mineral acid such as HCl, or a strong organic acid particularly formic or acetic acids, in proportions to obtain from 0.1 to 10% by weight, particularly 0.5 to 2% by weight, of acid based on the total emulsion formed. A typical resin content of such emulsions is from 45–75% by weight, based on the total emulsion.

Difficulty has however been experienced in stabilizing such emulsions. After storage, the emulsions tend to separate, giving rise to a condition known as "creaming," or during prolonged storage substantial separation of the aqueous phase from the dispersed phase. Stabilization is not premanent even when powerful mechanical means, e.g. colloid mills, have been used to effect the initial dispersion.

It has now been discovered that such acid emulsions of petroleum resins may effectively be stabilized against separation, by incorporating into the emulsion a small proportion of a water-soluble colloid which is compatible with mineral acids in the proportions used in such acid emulsion. Examples of substances forming such water-soluble colloids are polyvinyl alcohols, polyglycols and their fatty acid esters thereof, cellulose ethers, alkyl cellulose, alkyl hydroxy alkyl cellulose and soluble starches. Such water-soluble colloidal-forming substances are preferably present in the stabilized emulsions according to the invention in proportions from 0.1 to 5%, particularly from 0.3 to 1% by weight, based on the total emulsion.

The improved emulsions according to the invention may be obtained by dispersing the resin in an acidic aqueous phase using the cationic emulsifier, which may be incorporated in the said acid aqueous phase or the resin. Conventional mechanical dispersing aids may be employed, for instance colloid mills, centrifugal pumps, and turbine stirrers.

The cationic emulsifiers which may be used include organic nitrogen bases, including primary, secondary or tertiary aliphatic mono- or poly-amines, quaternary ammonium bases, amido-amines, amino acids. The alkoxylates derivatives, e.g. ethoxylated amino derivatives of polyamines and amido-amines may also be used with advantage, as may also the corresponding amine-salts of the amove amines. The proportion of cationic emulsifier used in the emulsions of the invention may range from 0.1 to 5%, particularly from 0.5 to 2% by weight, based on the total emulsion.

The colloid-producing compound may be incorporated into the aqueous phase before the resin has been dispersed therein, or to the emulsion during or immediately after formation. One particularly efficacious method of producing resin emulsions is by the so-called "recycling" technique in which the aqueous phase containing the emulsifier is circulated, and the resin or fluxed resin gradually injected into the aqueous phase during circulation. The colloid-producing substance may be incorporated according to the invention into the circulating stream with the resin, or gradually after the resin has been added and the emulsion is still circulating.

Pigments may be incorporated into the stabilized emulsions of the invention.

The following examples of the invention are provided:

Example 1

A number of emulsions were prepared of a steam-cracked resin having a "Ring and Ball" (ASTM D36–26) softening point of 100° C. The resin was fluxed with 35% by weight based on the resin of a Brightstock oil of viscosity 230 cs./50° C. (35° Engler) and 65 parts by weight of fluxed resin dispersed in 35 parts of acidified water, containing 1.5% by weight of octadecylamino-3 propylamine the dispersion being carried out at 80° C. in a Moritz turbine emulsifier.

A number of emulsions were made by this method, some of which contained a colloid stabilizer according to the invention. The formulations of the emulsions and their characteristics are set out in the following table.

um resin is fluxed with a mineral oil prior to being incorporated into the admixture.

TABLE I

| Formulation (based on total emulsion) | Emulsion No. | | | | | | | | | | |
|---|---|---|---|---|---|---|---|---|---|---|---|
| | 1 | 2 | 3 | 4 | 5 | 6 | 7 | 8 | 9 | 10 | 11 |
| Hydrochloric acid 22° Bé, percent | 1 | 1.5 | 1.5 | 1.5 | 1.5 | 1.5 | 1.5 | 1 | 1.5 | 1.5 | 1.5 |
| Stabilizing agent: | | | | | | | | | | | |
| Methylhydroxy-ethylcellulose, percent | | | 0.35 | 0.70 | 1 | | 0.35 | 0.70 | 0.70 | 1.75 | 2.45 |
| Polyvinyl alcohol, percent | 0.8 | 0.6 | 0.6 | 0.6 | 0.6 | 0.6 | 0.6 | 0.9 | 0.5 | 0.5 | 0.5 |
| Characteristics, pH | 3.1 | 3.1 | 2.8 | 2.6 | 2.5 | 3 | 3.1 | 2.8 | 2.8 | 2.4 | |
| Average diameter of resin particles (μ) | | | | | | | | | | | |
| Storage stability after 7 days: | | | | | | | | | | | |
| Percent creaming | 30 | 20 | 0 | 0 | 0 | 0 | 0 | 0 | 0 | 0 | 0 |
| Percent clear aqueous phase | 14 | 11 | 0 | 0 | 0 | 0 | 0 | 0 | 0 | 0 | 0 |
| Storage stability after 1 month: | | | | | | | | | | | |
| Percent creaming | 35 | 40 | 5 | 0 | 0 | 0 | 0 | 5 | 0 | 0 | 0 |
| Percent clear aqueous phase | 19 | 18 | 1 | 0 | 0 | 0 | 0 | 2 | 0 | 0 | 0 |

It will be noted from the storage stability tests of Table I that the stability of resin emulsions is greatly increased according to the invention by the formation in the resin of small proportions of an acid-stable colloid.

Example 2

Further tests were carried out wherein pigments were incorporated in the resin emulsions prepared according to Example 1. Thus from 11% to 20% by weight, based on the total emulsions, of Titanium White, Chrome Yellow and powdered red iron oxide were incorporated into the emulsions, and again no creaming was observed after 1 month.

Example 3

The emulsions of Example 2 were subjected to coating tests, wherein quartzite aggregates were mixed for 30 secs. with 10% by weight of the emulsions. After drying for 1 hour, the coated aggregates were washed with an acid solution to remove unbroken emulsion. The coated aggregates were immersed in water for 8 hours, and after this time the coating on the aggregates remained unbroken.

What is claimed is:
1. Stable aqueous acidic emulsions of the petroleum resin-in-water type consisting essentially of from about 45 to about 75 wt. percent of petroleum resin, water, acid, a cationic emulsifier, and an acid-stable, water-soluble colloid forming compound selected from the group consisting of polyvinyl alcohol, an alkyl cellulose, an alkyl hydroxy alkyl cellulose, polyglycol, polyglycol fatty acid esters, and a water-soluble starch.
2. Emulsions as claimed in claim 1 wherein the emulsifying agent is an N-long chain alkyl alkylene diamine.
3. Emulsions as claimed in claim 1 wherein the petroleum resin is fluxed with a mineral oil prior to being incorporated into the admixture.
4. Stable aqueous acidic emulsions of the petroleum resin-in-water type consisting essentially of from about 45 to about 75 wt. percent of petroleum resin, water, from about 0.1 to about 10 wt. percent of 22° Bé. hydrochloric acid, from about 0.1 to about 5.0 wt. percent of cationic emulsifier, and from about 0.1 to about 5.0 wt. percent of an acid-stable, water-soluble colloid forming compound selected from the group consisting of polyvinyl alcohol and methyl hydroxy ethyl cellulose.
5. Acidic mineral aggregates coated with stable aqueous acidic emulsions as defined in claim 1.
6. Acidic mineral aggregates coated with stable aqueous acidic emulsions as defined in claim 2.
7. Acidic mineral aggregates coated with stable aqueous acidic emulsions as defined in claim 3.
8. Acidic mineral aggregates coated with stable aqueous acidic emulsions as defined in claim 4.

References Cited

UNITED STATES PATENTS 2,681,322   6/1954   Auer _____ 260—13
2,809,948   10/1957  Hunter et al.

OTHER REFERENCES

"Piccopale"—Penn. Industrial Chem. Corp., August 1959.

WILLIAM H. SHORT, *Primary Examiner.*

E. A. NIELSEN, *Assistant Examiner.*

U.S. Cl. X.R.

260—17.4, 29.7